United States Patent
Linkesch et al.

(10) Patent No.: US 9,679,237 B2
(45) Date of Patent: Jun. 13, 2017

(54) BOARD EMBEDDED WITH ELECTRONIC DEVICE

(71) Applicant: Palletechnology, Inc., San Francisco, CA (US)

(72) Inventors: Richard Linkesch, San Francisco, CA (US); Anthony John Wainman, San Francisco, CA (US)

(73) Assignee: PALLETTECHNOLOGY, INC., San Francisco, CA (US)

( * ) Notice: Subject to any disclaimer, the term of this patent is extended or adjusted under 35 U.S.C. 154(b) by 0 days.

(21) Appl. No.: 15/207,060

(22) Filed: Jul. 11, 2016

(65) Prior Publication Data

US 2017/0083807 A1 Mar. 23, 2017

Related U.S. Application Data

(60) Provisional application No. 62/222,129, filed on Sep. 22, 2015.

(51) Int. Cl.
*G06K 19/00* (2006.01)
*G06K 19/077* (2006.01)

(52) U.S. Cl.
CPC . *G06K 19/07722* (2013.01); *G06K 19/07749* (2013.01)

(58) Field of Classification Search
USPC .............. 235/487, 492; 340/10, 572
See application file for complete search history.

(56) References Cited

U.S. PATENT DOCUMENTS

| | | | |
|---|---|---|---|
| 2006/0187057 A1* | 8/2006 | Yang | B31D 1/027 340/572.8 |
| 2009/0040024 A1* | 2/2009 | Boubtane | G01D 21/00 340/10.1 |
| 2014/0076731 A1* | 3/2014 | Russell-Clarke | H01Q 1/40 205/118 |

* cited by examiner

*Primary Examiner* — Matthew Mikels
(74) *Attorney, Agent, or Firm* — Schwegman, Lundberg & Woessner, P.A.

(57) ABSTRACT

The disclosed technology addresses the need in the art for a board embedded with an electronic device. In some embodiments, a board can be embedded with a Radio Frequency Emitting Device (RFED). The board can comprise at least a first layer and a second layer. The first layer can be made of a first paper based composite material and include at least a first enclosed cavity storing a RFED, wherein at least a portion of the first layer is coated with a moisture resistant material. The first layer can be affixed to the second layer that is made of a second material different than the first material, wherein at least a portion of the second layer is coated with the moisture resistant material.

20 Claims, 8 Drawing Sheets

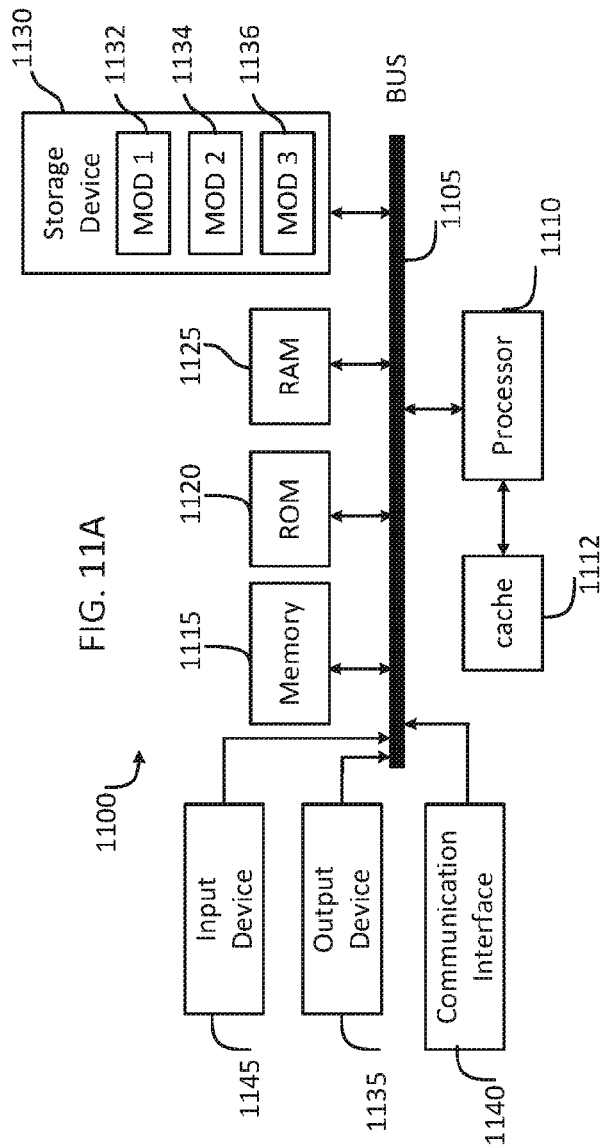
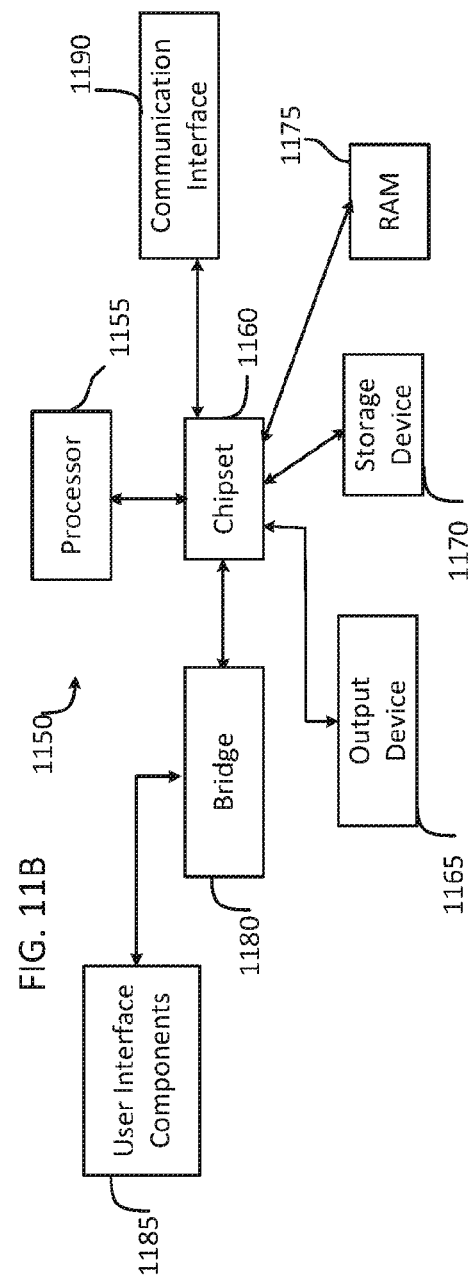
FIG. 11A
FIG. 11B

BOARD EMBEDDED WITH ELECTRONIC DEVICE

CROSS REFERENCE TO RELATED APPLICATIONS

This application claims the benefit of U.S. provisional application No. 62/222,129, filed on Sep. 22, 2015, which is expressly incorporated by reference herein in its entirety.

TECHNICAL FIELD

The present technology pertains to utilizing electronic devices to track and monitor objects, and more specifically pertains to a reusable board embedded with one or more electronic devices to track and monitor objects.

BACKGROUND

Shipping crates and shipping pallets are widely used to distribute items worldwide. For example, it is estimated that in the US alone, over 500 million shipping pallets are manufactured each year and 1.8-1.9 billion pallets are currently in use. The vast majority of these are constructed from wooden boards to provide a shipping surface upon which items can be placed and secured for transport and distribution. The shipping surface can be attached to one or more supporting legs or beams that provide a sufficient gap below the shipping surface to allow forklift prongs to be positioned underneath the shipping surface so that the pallet can be lifted and repositioned as desired.

One common issue with distributing items is tracking and monitoring the items as they travel from one location to another. For example, identifying each pallet when it departs and/or arrives at a location, as well as entering this data into a system is labor intensive and time consuming. It can also be difficult to determine what is happening to a pallet during transport from one location to another. One proposed solution is to attach electronic devices to the pallets to gather and transmit data during transport. For example, to reduce the time and labor required for tracking each pallet, Radio Frequency Emitting Devices (RFEDs) can be attached to the pallets to electronically track them as they depart and arrive at various locations. A shipping dock can be equipped with sensors that can read signals transmitted by an RFED to detect when a pallet has left or arrived at the shipping dock, and update a tracking system accordingly. As another example, electronic sensors can be attached to a pallet to gather information during shipping, such as location, condition monitoring, weight changes, etc.

Attaching an electronic device to a wooden pallet can present numerous obstacles. For example, due to the nature of shipping, attaching an electronic device to the exterior of a pallet can cause the electronic device to be damaged, removed, displayed, stolen or destroyed during transit. Creating a cavity to embed an electronic device within a wooden beam of a pallet can weaken the board, causing the wooden board to break during shipping. Further, wood naturally absorbs water and moisture, which can also damage, destroy or affect the functioning of an electronic device.

Using plastic in place of wood can alleviate problems caused by moisture, however plastic boards can be costly to manufacture and require a separate mold to create each desired size of plastic board. Embedding electronic devices within plastic requires the use of select electronic devices that can withstand the thermoforming temperatures required to mold plastic together. Accordingly, improvements are needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for a board embedded with an electronic device. In some embodiments, a board can be embedded with a Radio Frequency Emitting Device (RFED). The board can comprise at least a first layer and a second layer. The first layer can be made of a first paper based composite material and include at least a first enclosed cavity storing a RFED, wherein at least a portion of the first layer is coated with a moisture resistant material. The first layer can be affixed to the second layer that is made of a second material different than the first material, wherein at least a portion of the second layer is coated with the moisture resistant material.

In some embodiments, a board embedded with a Radio Frequency Emitting Device (RFED) can be manufactured by coating at least a portion of a first paper based composite material with a moisture resistant material, wherein the first paper based composite material comprises at least a first enclosed cavity storing a RFED. At least a portion of a second material can also be coated with the moisture resistant material. After coating the first paper based composite material and coating the second material, the first paper based composite material can be affixed to the second material to create a first board embedded with a RFED.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 11A and FIG. 11B illustrate exemplary possible system embodiments.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a board embedded with an electronic device to track and manage items during shipping. A board embedded with an electronic device can be used to build a shipping pallet or shipping crate and assist with tracking the shipping pallet or shipping crate during transit. For example, a board can be embedded with a Radio Frequency Emitting Device (RFED) that can be used to transmit data to sensors at a shipping facility. The RFED can transmit data indicating that a pallet has arrived or is departing a shipping facility. Further, the RFED can store information describing the items stored on the pallet. Likewise, the RFED can transmit data identifying the pallet, such as transmitting a unique identifier assigned to the pallet. In some embodiments, a board can be embedded with electronic sensors that can gather data during transit, such as motion sensors, location sensors, weight sensors, etc. The sensors can communicate with an embedded RFED to share the collected data, which can then be transmitted by the RFED. Although a shipping pallet and shipping crate are used as examples, these are only two possible embodiments are not meant to be limiting. A board embedded with an electronic device can be attached to any number of supply chain assets and used to track and manage shipping, transport etc. A supply chain asset can be any type of object used to ship or store an item. For example, a supply chain asset can be a pallet, shipping crate, beer keg, plastic tote, returnable plastic containers (RPC), airline container, intermediate bulk container, liquid container, dry container, hazardous container, horticulture container, etc.

Figure 1:
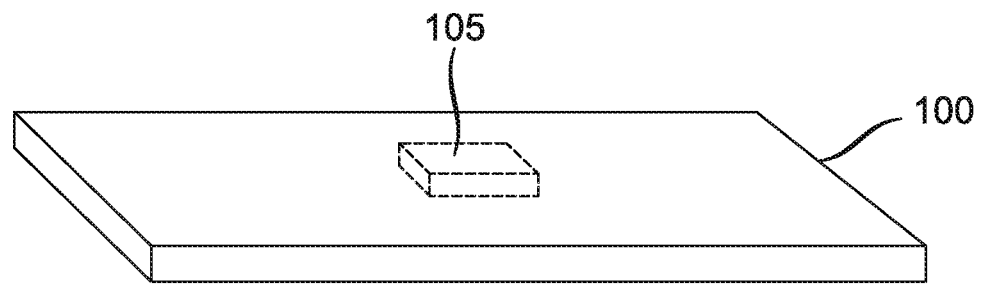
FIG. 1 shows an example of a board embedded with an electronic device.

FIG. 1 shows an example of a board embedded with an electronic device. As shown, board 100 can include enclosed cavity 105 to embed an electronic device into board 100. An electronic device can include any type of electronic device, such as an RFED, electronic sensor, etc. For example, an electronic device can include some or all of the features, components, and peripherals of computing device 1100 of FIGS. 11A and 11B.

Board 100 can be made of one or more layers of cellulose material, such as a paper based composite material like greyboard. Each layer can be affixed to each other to create board 100. For example, the layers can be affixed using a water and moisture resistant glue and/or resins such as Prefect Paper Adhesive (PPA) or other conventionally available moisture resistant glues. In a preferred embodiment, the material used to affix the layers can be a moisture resistant material to provide additional protection for an electronic device embedded within board 100. Affixing two layers together can include affixing the layers directly together or affixing the two layers together indirectly via one or more intermediate layers positioned between them.

Enclosed cavity 105 can be made within one or more layers of board 100. For example, during manufacturing of board 100, laser cutting or other subtractive manufacturing techniques can be used to create enclosed cavity 105, after which an electronic device can be placed within enclosed cavity 105. Additional material or layers can be added to enclose enclosed cavity 105, thereby securing the electronic device within board 100. Enclosed cavity 105 can be made to any desired size or dimension. For example, enclosed cavity 105 can be made to a specified dimension to fit a specified electronic device, such as an RFED or a sensor.

Board 100 can be made to any size, thickness, length or other desired specification. For example, the layers of cellulose material can be cut to any desired dimension and any number of layers can be used to create a desired thickness. In some embodiments, board 100 can be made to a specified size for use in constructing an object such as a pallet or shipping container.

Enclosed cavity 105 can be located at any desired location within board 100. For example, enclosed cavity 105 can be located near and end of board 100, at or substantially near the center of board 100, etc. In some embodiments, it may be beneficial to locate enclosed cavity 105 at or near the center of board 100 to provide additional protection for an electronic device within enclosed cavity 105. For example, board 100 can be used to create a pallet for shipping items, and the center of the pallet may provide the greatest protection against damage during shipping. Accordingly, enclosed cavity 105 can be located at or substantially near the center of board 100 when manufactured for this use.

To provide additional protection for the electronic device embedded within board 100, each layer of board 100 can be coated with a moisture resistant resin or other barrier coating. For example, each layer can be coated with a thermally or magnetically cured hydrophobic resin such as polytetrafluoroethylene (e.g., Teflon®). Coating each layer with a moisture resistant resin can provide moisture resistance, fire retardancy, bacterial and viral protection, etc., to protect an electronic device embedded within enclosed cavity 105.

In some embodiments, layers of board 100 can be coated with a moisture resistant resin prior to creation of enclosed cavity 105. For example, a layer can be coated with the moisture resistant resin prior to a portion of the layer being cut to create enclosed cavity 105. Alternatively, a layer can be coated with the moisture resistant resin after it has been cut to create enclosed cavity 105.

Figure 2:
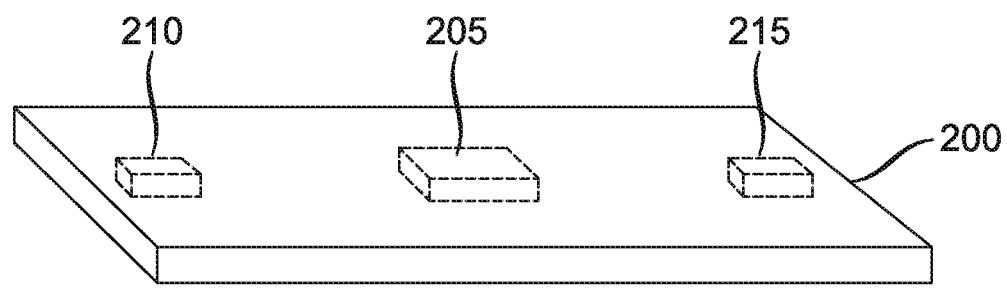
FIG. 2 shows an example of a board embedded with multiple electronic devices.

FIG. 2 shows an example of a board that can be embedded with multiple electronic devices. As shown, board 200 includes enclosed cavity 205, enclosed cavity 210 and enclosed cavity 215. Each of the enclosed cavities 205, 210 and 215 can be used to embed an electronic device within board 200, although this is not required. For example, an RFED can be embedded within enclosed cavity 205 and electronic sensors can be embedded in one or both of enclosed cavities 210 and 215. Devices other than electronic devices can also be embedded that can serve as an integral part of the system. Such devices can include strain coils, buttons, actuators, drives, rails, etc.

Figure 3:
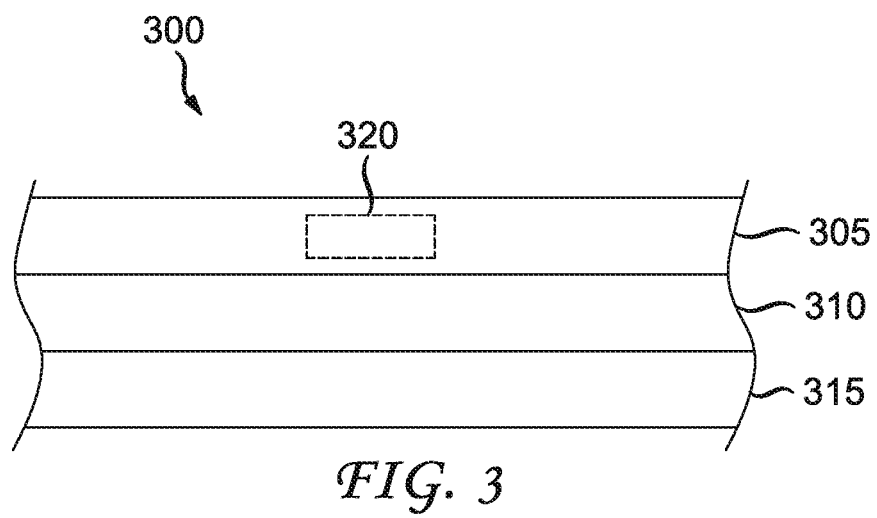
FIG. 3 shows an example side view of a board embedded with an electronic device.

FIG. 3 shows an example side view of a board embedded with an electronic device. As shown, board 300 is made of layers 305, 310 and 315. Although only three layers are shown, this is only one example. Board 300 can be made of any number of boards, as desired.

Each of layers 305, 310 and 315 can be made of a cellulose material, such as greyboard. In some embodiments, each layer 305, 310 and 315 can be made of the same cellulose material. Alternatively, some of layers 305, 310 and 315 can be made of different or varying types of cellulose materials. Alternatively, in some embodiments, one or more of layers 305, 310 and 315 can be made of a non-cellulose material, such as plastic, electric grade fiber board, carbon fiber, or even metallic layers.

In some embodiments, the layers can be made of materials with varying densities to provide additional strength or protection to board 300 and/or an electronic device embedded within board 300. For example, if board 300 is intended for use in a pallet or shipping crate, it may be advantageous to use a cellulose material with a higher density for layers that may be in direct contact with machinery or other objects that may cause damage to board 300. Hence, if board 300 is used to make a shipping surface of a pallet, layer 315 may be in direct contact with forklifts or other machinery used to lift and transport the pallet. Accordingly, it may be desirable for layer 315 to be made of a material that has greater density and strength than the cellulose material used for layers 310 and 305.

As shown, board 300 includes enclosed cavity 320 within layer 305, which is the top layer of board 300. This can be advantageous when board 300 is used as in a pallet as it provides additional protection from forklifts or other machinery that may be used to lift and transport the pallet. Alternatively, enclosed cavity can be included in one or more of the other layers of board 300, such as layer 310.

Figure 4:
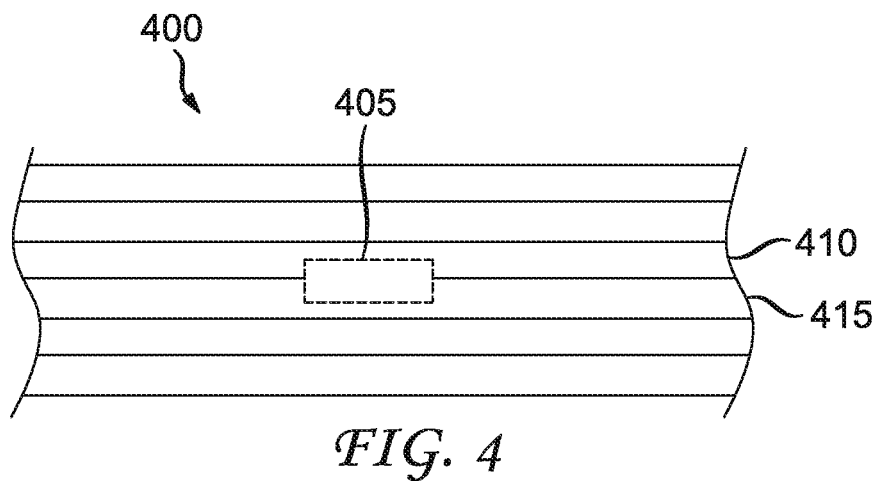
FIG. 4 shows another example side view of a board embedded with an electronic device.

FIG. 4 shows another example side view of a board embedded with an electronic device. As shown, board 400 is made of six individual layers affixed to each other. Board 400 includes enclosed cavity 405 made out of layer 410 and layer 415. Although enclosed cavity 405 is shown within two layers, this is just one embodiments and is not meant to be limiting. An enclosed cavity can be made out of any number of layers.

Figure 5A:
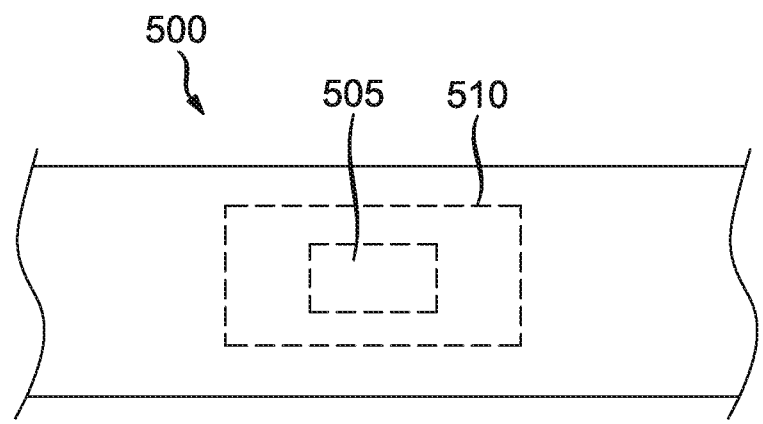
FIGS. 5A and 5B show an example top and side view of a board including a high impact resistant portion to enclose an enclosed cavity.
Figure 5B:
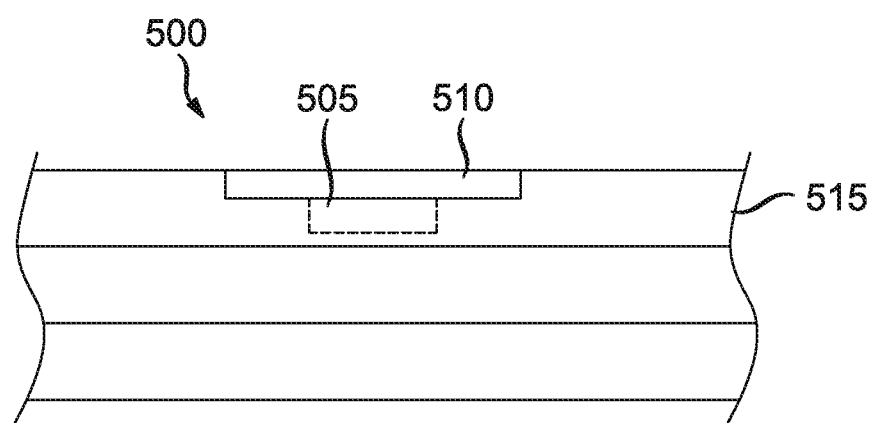

FIGS. 5A and 5B show an example top and side view of a board including a high impact resistant portion to enclose an enclosed cavity. FIG. 5A shows a top view of board 500. As shown, board 500 includes enclosed cavity 505 used to embed an electronic device within board 500. To further protect an electronic device included within enclosed cavity 505, board 500 can include high impact resistant portion 510 positioned over enclosed cavity 505. High impact resistant portion 510 can be made of any type of high impact resistant material, such as electrical grade fiberglass (e.g., GPO3).

As shown, high impact resistant portion 510 is limited in size to covering enclosed cavity 505. This can reduce the cost of manufacturing board 500 by limiting the amount of high impact resistant material used in board 500 to only what is needed to provide adequate protection to an electronic device embedded within board 500.

FIG. 5B shows a side view of board 500. As shown, enclosed cavity 505 is made within layer 515. High impact resistant portion 505 is also included within layer 515 and positioned over enclosed cavity 505. During manufacturing, layer 515 can be made to include space for enclosed cavity 505 and high impact resistant portion 505. After an electronic device is placed within enclosed cavity 505, high impact resistant portion 510 can be added to enclose the electronic device within enclosed cavity 505.

Figure 6:
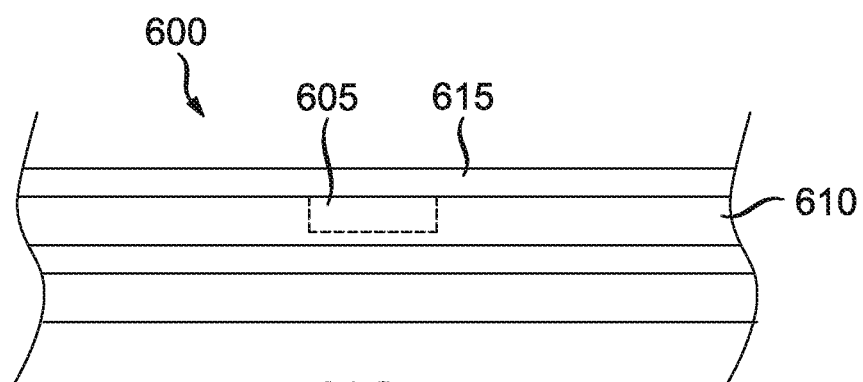
FIG. 6 shows an example side view of a board including a high impact resistant portion to enclose an enclosed cavity.

FIG. 6 shows an example side view of a board including a high impact resistant portion to enclose an enclosed cavity. As shown board 600 includes enclosed cavity 605 within layer 610. Board 600 further includes layer 615 affixed above layer 610, which encloses enclosed cavity 605. Layer 610 can be made of a high impact resistant material such as electrical grade fiberglass.

Figure 7A:
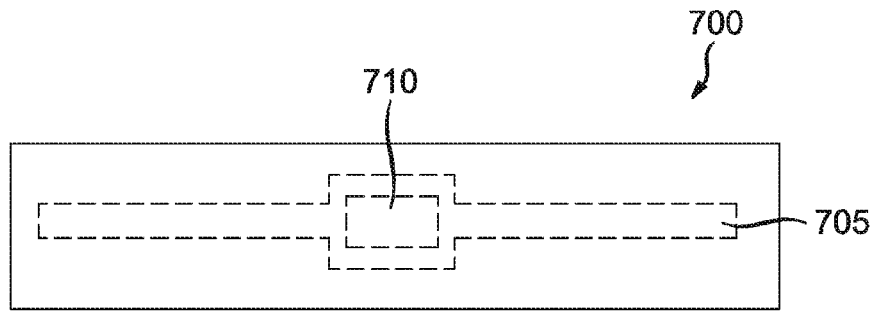
FIGS. 7A-7C show examples of a board including a support beam.
Figure 7B:
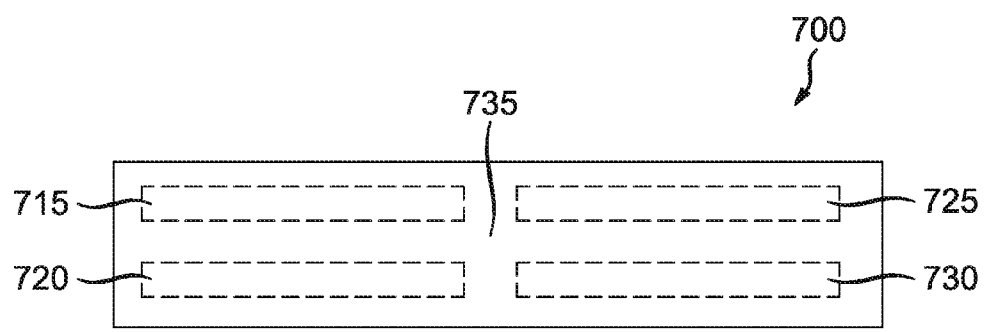
Figure 7C:
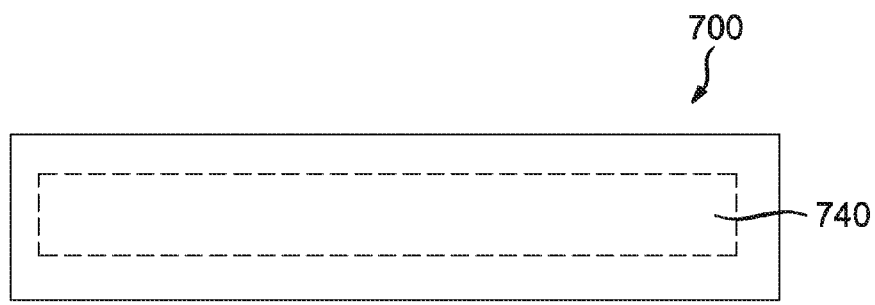

FIGS. 7A-7C show examples of a board including a support beam. As shown, board 700 includes embedded support beam 705. Embedded support beam 705 can be made of a rigid material such as aluminum, carbon fiber, iron, hard plastic, etc., to provide additional support to board 700. For example, embedded support beam 705 can be included in board 700 to increase the weight that can be supported by board 700 by items during shipping. As shown, embedded support beam 705 can span the length of board 700. Additionally, embedded support beam 705 can be shaped to create space 710 to include an embedded electronic device.

FIG. 7B shows another example of board 700 including a support beam. As shown, board 700 includes embedded support beams 715, 720, 725 and 730. Embedded support beams 715, 720 can be located to provide support for one half of board 700, and embedded support beams 725 and 730 can be located to provide support for the opposite half of board 7009. Further embedded support beams 715, 720, 725 and 730 can be positioned to leave space 735 in the middle of board 700 to allow room in which an electronic device can be embedded within board 700.

FIG. 7C shows another example of board 700 including a support beam. As shown, board 700 includes embedded support beam 740 that spans the entire length of board 700. In this type of embodiment, embedded support beam 740 can be positioned either below or above an embedded cavity in board 700 in which an electronic device can be embedded.

Figure 8A:
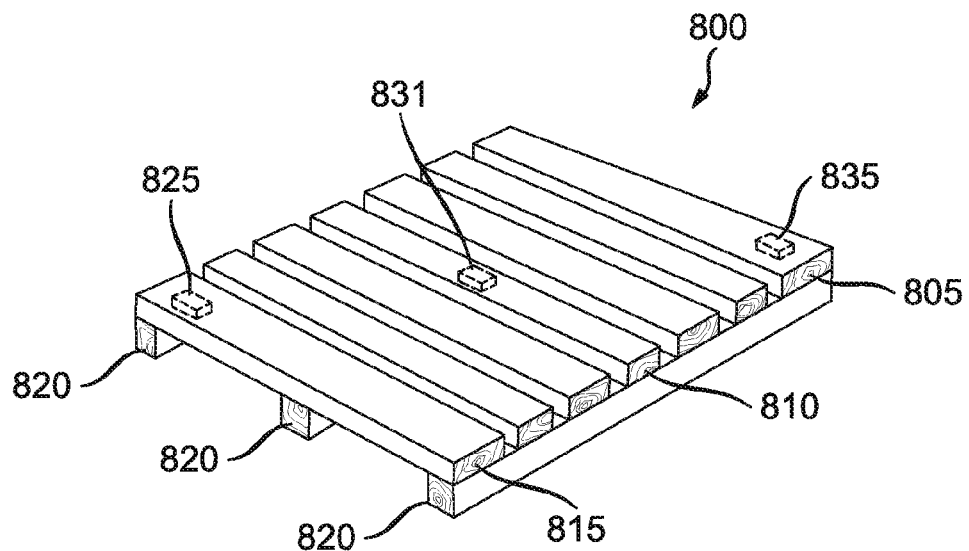
FIGS. 8A and 8B show examples of a pallet including a board embedded with an electronic device.
Figure 8B:
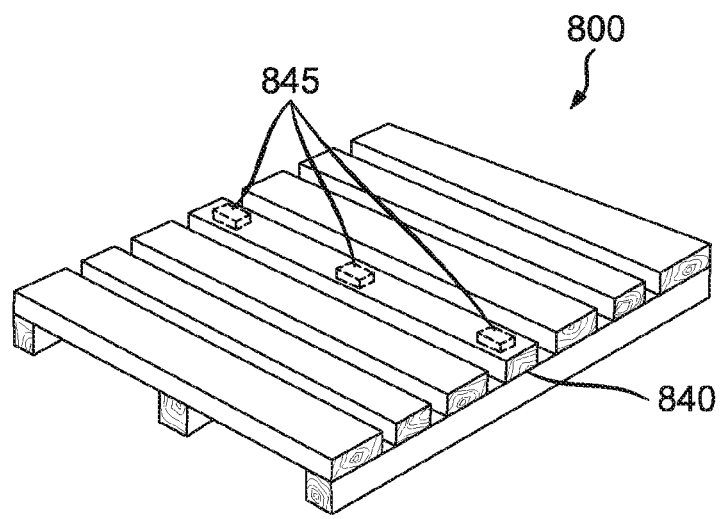

FIGS. 8A and 8B show examples of a pallet including a board embedded with an electronic device. As shown in FIG. 8A, pallet 800 includes multiple boards 805, 810 and 815, coupled to supporting legs 820. Boards 805, 810 and 815 create a portion of a shipping surface upon which items can be placed and prepared for shipping. Each of boards 805, 810 and 815 can be coupled to supporting legs 820 using any means know in the art, such as nails, screws, glue, etc.

As shown board 805, 810 and 815 can include enclosed cavities 825, 830 and 835, respectively, that includes an electronic device. Boards 805, 810 and 815 can be made from layers of cellulose material, such as boards 100, 200, 300, 400, 500, 600 and 700 described above. Alternatively, the remainder of pallet 800, including other boards used to create the shipping surface and supporting legs 820 can be made of any material used to manufacture pallets, such as wood.

In some embodiments, board 805, 810 and 815 can be detachably coupled to supporting legs 820 so that board 805, 810 and 815 can be coupled and decoupled as desired. For example, board 805, 810 and 815 can be coupled to supporting legs 820 using screws, nails, etc., which can be removed to decouple board 805, 810 and 815 from supporting legs 820. This can allow board 805, 810 and 820 to be coupled to any existing wooden pallet as well as removed from a wooden pallet to be coupled to another wooden pallet. In this way, board 805, 810 and 815 can be used with any existing pallet, as well as be reusable and remain in use even if pallet 800 is damaged or otherwise ruined.

As shown, board 810 is placed as the middle board of pallet 800. Further, enclosed space 830 is positioned substantially in the center of board 810, thereby positioning the electronic device embedded within board 810 substantially in the center of pallet 800. This can provide the electronic device with greater security against damage caused by use of pallet 800 for shipping items.

As shown, board 805 and board 815 both include enclosed spaces 825 and 835 positioned near the end of boards 805 and 815. Accordingly, boards 805 and 815 can also be embedded with electronic devices that work in conjunction with or separately from an electronic device embedded within board 810.

FIG. 8B shows another example of a pallet including a board embedded with an electronic device. As shown, pallet 800 includes board 840. Board 840 can include three enclosed spaces 845. Electronic devices can be embedded in one or more of enclosed spaces 845.

Figure 9:
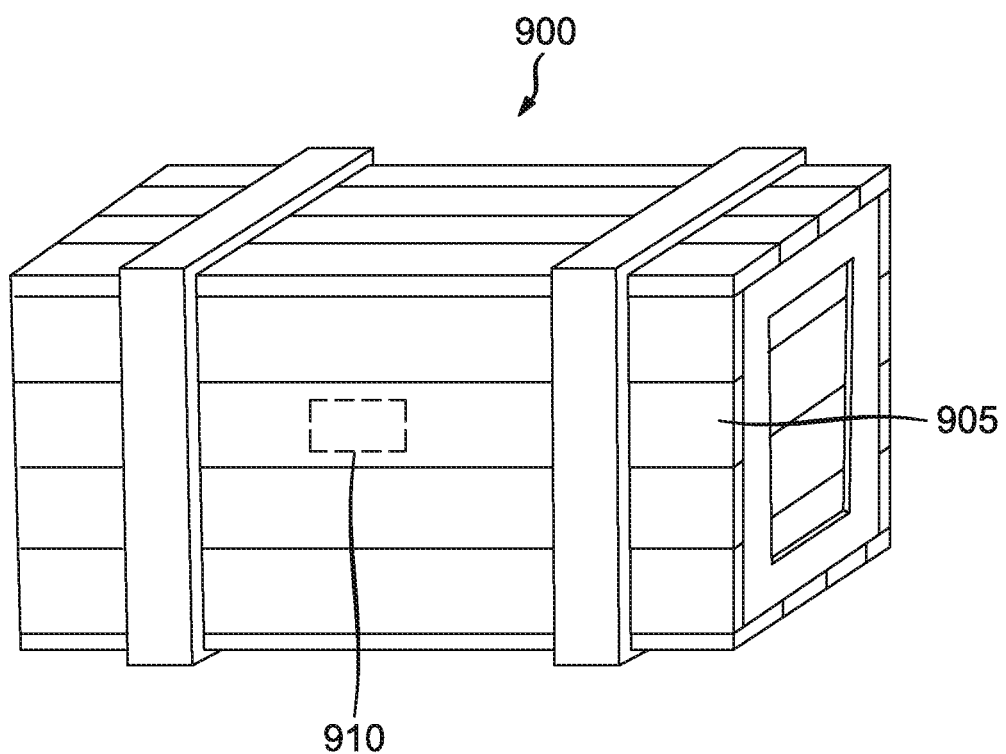
FIG. 9 shows an example of a shipping crate including a board embedded with an electronic device.

FIG. 9 shows an example of a shipping crate including a board embedded with an electronic device. As shown, shipping crate 900 can include board 905 coupled to at least one other board to form shipping crate 900. While board 900 can be made of layers of cellulose material, the other boards of shipping crate 900 can be made of any other material used to create shipping crates, such as wood. As shown, board 900 can include enclosed space 910 which can include an electronic device such as an RFED. Board 905 can be detachably coupled through use of screws, nails, or other means such that board 900 can be coupled and decoupled from shipping crate 900.

Figure 10:
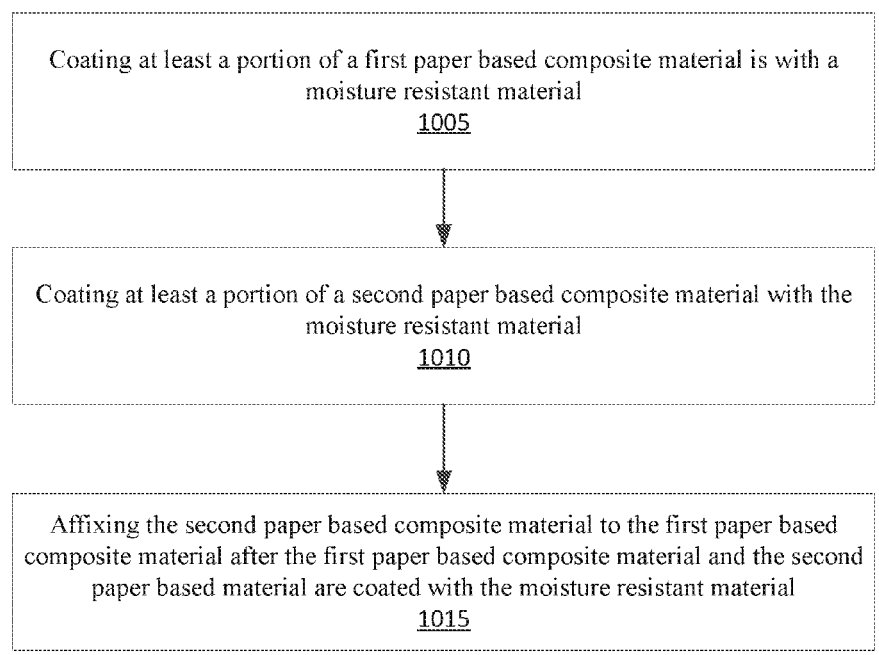
FIG. 10 shows an example method of creating a board embedded with an electronic device.

FIG. 10 shows an example method of creating a board embedded with an electronic device. At step 1005, at least a portion of a first paper based composite material is coated with a moisture resistant material, wherein the first paper based composite material comprises at least a first enclosed cavity storing an electronic device, such as an RFED or electronic sensor.

At step 1010, at least a portion of a second paper based composite material is coated with the moisture resistant material. At step 1015 the second paper based composite material is affixed to the first paper based composite material after the first paper based composite material and the second paper based material are coated with the moisture resistant material. Affixing the first paper based material to the second paper based material can result in a first board embedded with an electronic device, such as an RFED or electronic sensor.

FIG. 11A, and FIG. 11B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 1105. Exemplary system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software modules 1132, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B illustrates a computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1155, representative of any number of physically and/or logically distinct resources capable of executing software, firmware, and hardware configured to perform identified computations. Processor 1155 can communicate with a chipset 1160 that can control input to and output from processor 1155. In this example, chipset 1160 outputs information to output 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1155 analyzing data stored in storage 1170 or 1175. Further, the machine can receive inputs from a user via user interface components 1185 and execute appropriate functions, such as browsing functions by interpreting these inputs using processor 1155.

It can be appreciated that exemplary systems 1100 and 1150 can have more than one processor 1110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
coating at least a portion of a first paper based composite material with a moisture resistant material, wherein the first paper based composite material comprises at least a portion of a first enclosed cavity storing a Radio Frequency Emitting Device (RFED);
coating at least a portion of a second material with the moisture resistant material;
after coating the first paper based composite material and coating the second material, affixing the first paper based composite material to the second material to create at least a portion of a first board embedded with a RFED, wherein the first paper based composite material is a first density and the second material is a second density, wherein the second density is greater than the first density;
detachably coupling the first board to at least a first supporting leg of a pallet such that, after being coupled to the first supporting leg, the second material is positioned between the first paper based composite material and the first supporting leg of the pallet, and the board forms at least a portion of a shipping surface of the pallet; and
detachably coupling a second board to the first supporting leg such that, after being coupled to the first supporting leg, the second board forms a second portion of the shipping surface of the pallet.

2. The method of claim 1, further comprising:
decoupling the board from the first supporting leg; and
detachably coupling the board to a second supporting leg of a second pallet such that, after being coupled to the second supporting leg the board forms at least a portion of a shipping surface of the second pallet.

3. The method of claim 1, further comprising:
creating a first cavity in the first paper based composite material;
placing the RFED in the first cavity; and
affixing a high impact resin material over the first cavity to create the first enclosed cavity storing the RFED.

4. The method of claim 3, wherein the first cavity is created at or substantially near the center of the first paper based composite material.

5. The method of claim 3, further comprising:
creating a second cavity in the first paper based composite material;
placing an electronic sensor in the second cavity; and
affixing the high impact resin material over the second cavity to create a second enclosed cavity storing the electronic sensor.

6. The method of claim 1, further comprising:
coating at least a portion of a third paper based composite material with the moisture resistant material; and
affixing the third paper based composite material to the first paper based composite and the second material.

7. The method of claim 1, further comprising:
decoupling the board from the first supporting leg; and
detachably coupling the board to at least a second board to form at least a portion of a supply chain asset.

8. The method of claim 7, wherein the supply chain asset is one of a pallet, shipping crate, beer keg, plastic tote, returnable plastic containers (RPC), airline container, intermediate bulk container, liquid container, dry container, hazardous container or horticulture container.

9. A method comprising:
coating at least a portion of a first paper based composite material with a moisture resistant material, wherein the first paper based composite material comprises at least a portion of a first enclosed cavity storing a Radio Frequency Emitting Device (RFED);
coating at least a portion of a second material with the moisture resistant material;
after coating the first paper based composite material and coating the second material, affixing the first paper based composite material to the second material to create at least a portion of a first board embedded with a RFED, wherein the first paper based composite material is a first density and the second material is a second density, wherein the second density is greater than the first density;
detachably coupling the board to at least a first supporting leg of a pallet such that, after being coupled to the first supporting leg, the second material is positioned between the first paper based composite material and the first supporting leg of the pallet, and the board forms at least a portion of a shipping surface of the pallet;
decoupling the board from the first supporting leg; and
detachably coupling the board to a second supporting leg of a second pallet such that, after being coupled to the second supporting leg the board forms at least a portion of a shipping surface of the second pallet.

10. The method of claim 9, further comprising:
creating a first cavity in the first paper based composite material;
placing the RFED in the first cavity; and
affixing a high impact resin material over the first cavity to create the first enclosed cavity storing the RFED.

11. The method of claim 10, wherein the first cavity is created at or substantially near the center of the first paper based composite material.

12. The method of claim 10, further comprising:
creating a second cavity in the first paper based composite material;
placing an electronic sensor in the second cavity; and
affixing the high impact resin material over the second cavity to create a second enclosed cavity storing the electronic sensor.

13. The method of claim 9, further comprising:
coating at least a portion of a third paper based composite material with the moisture resistant material; and
affixing the third paper based composite material to the first paper based composite and the second material.

14. A method comprising:
coating at least a portion of a first paper based composite material with a moisture resistant material, wherein the first paper based composite material comprises at least a portion of a first enclosed cavity storing a Radio Frequency Emitting Device (RFED);
coating at least a portion of a second material with the moisture resistant material;
after coating the first paper based composite material and coating the second material, affixing the first paper based composite material to the second material to create at least a portion of a first board embedded with a RFED, wherein the first paper based composite material is a first density and the second material is a second density, wherein the second density is greater than the first density;
coating at least a portion of a third paper based composite material with the moisture resistant material; and
affixing the third paper based composite material to the first paper based composite and the second material.

15. The method of claim 14, further comprising:
detachably coupling the board to at least a first supporting leg of a pallet such that, after being coupled to the first supporting leg, the second material is positioned between the first paper based composite material and the first supporting leg of the pallet, and the board forms at least a portion of a shipping surface of the pallet.

16. The method of claim 14, further comprising:
creating a first cavity in the first paper based composite material;
placing the RFED in the first cavity; and
affixing a high impact resin material over the first cavity to create the first enclosed cavity storing the RFED.

17. The method of claim 16, wherein the first cavity is created at or substantially near the center of the first paper based composite material.

18. The method of claim 16, further comprising:
creating a second cavity in the first paper based composite material;
placing an electronic sensor in the second cavity; and
affixing the high impact resin material over the second cavity to create a second enclosed cavity storing the electronic sensor.

19. The method of claim 14, further comprising:
detachably coupling the board to at least a second board to form at least a portion of a supply chain asset.

20. The method of claim 19, wherein the supply chain asset is one of a pallet, shipping crate, beer keg, plastic tote, returnable plastic containers (RPC), airline container, intermediate bulk container, liquid container, dry container, hazardous container or horticulture container.

* * * * *